US009225370B2

(12) United States Patent
Tazebay et al.

(10) Patent No.: US 9,225,370 B2
(45) Date of Patent: Dec. 29, 2015

(54) METHOD AND SYSTEM FOR A COMBINED SIGNAL DETECTION FOR PHYSICAL LAYER COMMUNICATION DEVICES (71) Applicant: Broadcom Corporation, Irvine, CA (US)

(72) Inventors: Mehmet Tazebay, Irvine, CA (US); Scott Powell, Carlsbad, CA (US); Peiqing Wang, Irvine, CA (US); Bruce Conway, Aliso Viejo, CA (US); Sang Bui, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/645,704

(22) Filed: Mar. 12, 2015

(65) Prior Publication Data
US 2015/0188586 A1 Jul. 2, 2015

Related U.S. Application Data (63) Continuation of application No. 12/536,172, filed on Aug. 5, 2009, now Pat. No. 9,008,244.

(60) Provisional application No. 61/112,951, filed on Nov. 10, 2008, provisional application No. 61/228,253, filed on Jul. 24, 2009.

(51) Int. Cl.
*H04B 1/12* (2006.01)
*H04B 1/7097* (2011.01)
(Continued)

(52) U.S. Cl.
CPC ............... *H04B 1/12* (2013.01); *H04B 1/7097* (2013.01); *H04B 3/23* (2013.01); *H04B 3/32* (2013.01)

(58) Field of Classification Search
CPC ........ H04B 3/23; H04B 3/234; H04B 1/7097; H04B 1/7105; H04B 1/71055; H04B 3/32; H04B 3/20; H04B 3/238; H04B 1/12; H04L 5/006; H04M 9/082; H04M 3/18
USPC ......... 375/219, 295, 316, 346, 348, 350, 259, 375/285, 340, 324; 379/1.01, 3, 406.01, 379/406.06, 406.15; 370/276, 282, 286, 370/289, 201
See application file for complete search history.

(56) References Cited

U.S. PATENT DOCUMENTS 4,096,362 A * 6/1978 Crawford ...................... 379/403
4,995,104 A 2/1991 Gitlin
(Continued)

OTHER PUBLICATIONS

European Search Report dated Mar. 12, 2010 in European Patent Application No. 09013962.7-2411.
(Continued)

*Primary Examiner* — Vineeta Panwalkar
(74) *Attorney, Agent, or Firm* — Oblon, McClelland, Maier & Neustadt, L.L.P.

(57) ABSTRACT

Communication devices coupled via a communication link may comprise physical layer devices that may be operable to determine presence of a received signal and to mitigate noise in the signal prior to processing and/or validating the signal. Analog and/or digital signal processing may be utilized to process the signal and/or mitigate noise in the signal. Noise mitigation may comprise near-end crosstalk cancelling and/or echo cancelling and/or may utilize local transmit signal information. Subsequent to noise mitigation, samples of the noise reduced signal may be accumulated and/or an average signal strength and/or average signal power level may be determined. The average signal strength and/or average signal power level may be compared to one or more thresholds which may be configurable and/or programmable.

21 Claims, 6 Drawing Sheets (51) Int. Cl.
*H04B 3/23* (2006.01)
*H04B 3/32* (2006.01)

(56) References Cited

U.S. PATENT DOCUMENTS

| | | |
|---|---|---|
| 5,564,090 A | 10/1996 | Beauchamp et al. |
| 5,640,146 A | 6/1997 | Campana, Jr. |
| 6,002,762 A | 12/1999 | Ramsden |
| 6,009,124 A | 12/1999 | Smith et al. |
| 6,064,890 A | 5/2000 | Hirose et al. |
| 6,678,319 B1 | 1/2004 | Jamali |
| 7,224,743 B2 | 5/2007 | Holmes et al. |
| 2004/0128331 A1 | 7/2004 | Hinds et al. |
| 2005/0079841 A1 | 4/2005 | Astrachan et al. |
| 2006/0067440 A1 | 3/2006 | Hsu et al. |
| 2008/0043888 A1 | 2/2008 | Bhukania et al. |
| 2008/0144753 A1* | 6/2008 | Saed et al. .................... 375/347 |

OTHER PUBLICATIONS

Office Action issued May 17, 2012, in Chinese Patent Application No. 200910222789.4.
Office Action issued Jun. 19, 2013, in Taiwanese Patent Application No. 098138170.
Office Action issued Nov. 29, 2013, in Taiwanese Patent Application No. 098138170.
Office Action issued Nov. 14, 2012, in Chinese Patent Application No. 200910222789.4.

* cited by examiner

METHOD AND SYSTEM FOR A COMBINED SIGNAL DETECTION FOR PHYSICAL LAYER COMMUNICATION DEVICES

CROSS-REFERENCE TO RELATED APPLICATIONS/INCORPORATION BY REFERENCE

This application is a continuation of U.S. application Ser. No. 12/536,172 filed Aug. 5, 2009, which makes reference to, claims priority to, and claims the benefit of U.S. Provisional Application Ser. No. 61/112,951, filed on Nov. 10, 2008, and U.S. Provisional Application Ser. No. 61/228,253, filed on Jul. 24, 2009.

Each of the above stated applications is hereby incorporated herein by reference in its entirety.

FIELD OF THE INVENTION

Certain embodiments of the invention relate to communication. More specifically, certain embodiments of the invention relate to a method and system for a combined signal detection for physical layer communication devices.

BACKGROUND OF THE INVENTION

Communication devices and/or networks are becoming an increasingly popular means of exchanging data of various types and sizes for a variety of applications. In this regard, communication devices are increasingly being utilized to communicate voice, data, and multimedia traffic. Accordingly, more and more devices are being equipped to interface with other communication devices and/or networks. Broadband connectivity including Internet, cable, phone and voice over IP (VOIP) offered by service providers has led to increased traffic and more recently, migration to Ethernet networking. Much of the demand for connectivity is driven by a shift to electronic lifestyles involving desktop computers, laptop computers, and various handheld communication devices such as smart phones and PDA's. Applications such as search engines, reservation systems and video on demand (VOD) that may be offered at all hours of a day and seven days a week, have become increasingly popular.

These recent developments have led to increased demand for data aggregation and high performance computing (HPC), and also increased demand on datacenter, and/or core networking resources. As the number of devices connected to data networks increases and demand for higher bandwidths increases, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a combined signal detection for physical layer communication devices, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for a combined signal detection for physical layer communication devices. One or more communication devices that may be coupled via a communication link may comprise physical layer devices that may be operable to determine presence of a signal received via the communication link and to mitigate noise in the signal prior to processing the signal. In this regard, processing the signal may comprise validating the signal. Analog and/or digital signal processing may be utilized to process the signal and/or mitigate noise in the signal. For example, noise mitigation may comprise near-end crosstalk cancelling and/or echo cancelling. The process of noise mitigation may utilize local transmit signal information, for example. Subsequent to noise mitigation, samples of the noise reduced signal may be accumulated and/or an average signal strength and/or average signal power level may be determined. The average signal strength and/or average signal power level of the noise reduced signal may be compared to one or more thresholds. The thresholds may be configurable and/or programmable. In this manner, a received signal may undergo noise mitigation prior to determining whether the signal is a valid signal from a link partner, for example.

Figure 1:
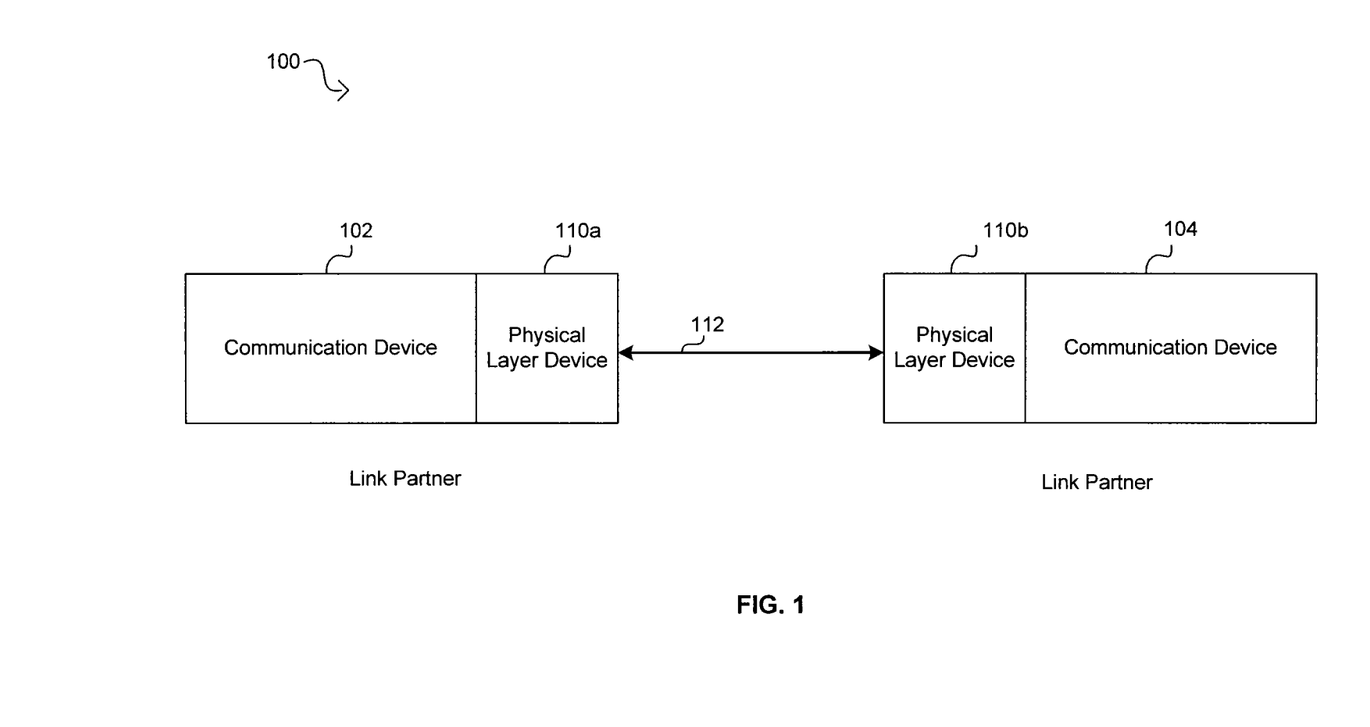
FIG. 1 is a block diagram illustrating exemplary communication devices comprising a physical layer connection via a link, in accordance with an embodiment of the invention.

FIG. 1 is a block diagram illustrating exemplary communication devices comprising a physical layer connection via a link, in accordance with an embodiment of the invention. Referring to FIG. 1, there is shown a system 100 that may comprise a communication device 102 and a communication device 104. The communication devices 102 and 104 may comprise PHY devices 110a and 110b respectively. A link 112 is also shown.

The system 100 may be implemented in various wire-line and/or wireless communication systems and/or networks. For example, the system 100 may be implemented based on IEEE 802.3 specifications and/or based on variations and/or extensions thereof. Exemplary embodiments of the invention may comprise, for example, one or more of a switch, an end point device, a router, a computer system and/or audio/video (NV) enabled equipment.

The communication devices 102 and 104 may communicate via the link 112. In this regard, the link 112 is not limited to any specific medium and may comprise any suitable medium. Exemplary link 112 media may comprise copper and/or backplane technologies. For example, a copper medium such as STP, Cat3, Cat 5, Cat 5e, Cat 6, Cat 7 and/or Cat 7a as well as ISO nomenclature variants may be utilized. Additionally, copper media technologies such as InfiniBand, Ribbon and backplane may be utilized.

In an exemplary embodiment of the invention, the link 112 may comprise up to four or more physical channels, each of which may, for example, comprise an unshielded twisted pair (UTP). The communication devices 102 and/or 104 may communicate via two or more physical channels comprising the link 112. For example, Ethernet over twisted pair standards 10BASE-T and 100BASE-TX may utilize two pairs of UTP while Ethernet over twisted pair standards 1000BASE-T and 10GBASE-T may utilize four pairs of UTP.

In an exemplary embodiment of the invention, the communication devices 102 and/or 104 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

In another exemplary embodiment of the invention, the communication devices 102 and/or 104 may comprise a backplane PHY capable of operating at one or more standard rates such as 10 Gbps (10GBASE-KX4 and/or 10GBASE-KR); and/or non-standard rates such as 2.5 Gbps and 5 Gbps.

The communication devices 102 and/or 104 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported.

The PHY devices 110a and 110b may each comprise suitable logic, circuitry, interfaces and/or code that may enable communication, for example, transmission and reception of data, between the communication devices 102 and 104. In this regard, the PHY devices 110a and 110b may communicate via a media dependent interface (MDI). The PHY devices 110a and 110b may support, for example, Ethernet over copper, and/or backplane Ethernet operations. The PHY devices 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rate limits and/or non-standard data rate limits. Moreover, the PHY devices 110a and 110b may support standard Ethernet link lengths or ranges of operation and/or extended ranges of operation.

In operation, the communication devices 102 and/or 104 may communicate via the PHY devices 110a and/or 110b and via the link 112. In this regard, the PHY devices 110a and/or 110b may utilize half duplex and/or full duplex techniques. Moreover, the communication devices 102 and/or 104 may communicate with point-to-point and/or point-to-multi-point communication protocols. The communication devices 102 and/or 104 may receive noise and/or interference via the link 112 and/or may generate internal noise and/or interference. For example, during a full and/or half duplex mode of operation, energy from crosstalk, echo and/or other disturbances in the system 100 may be received by one or both of the PHY devices 110a and 110b. For example, near-end crosstalk may be from neighboring channels of the link 112. The energy may be received during reception of valid signals and/or when valid signals are not present. In addition, valid signals may be attenuated during transmission via the link 112. In various embodiments of the invention, one or both of the PHY devices 110a and/or 110b may utilize analog and/or digital signal processing techniques to detect when received energy comprises a valid signal or when received energy comprises only noise or interference. In this regard, one or both of the PHY devices 110a and/or 110b may be operable to condition the received signal prior to determining validity of the signal.

Figure 2:
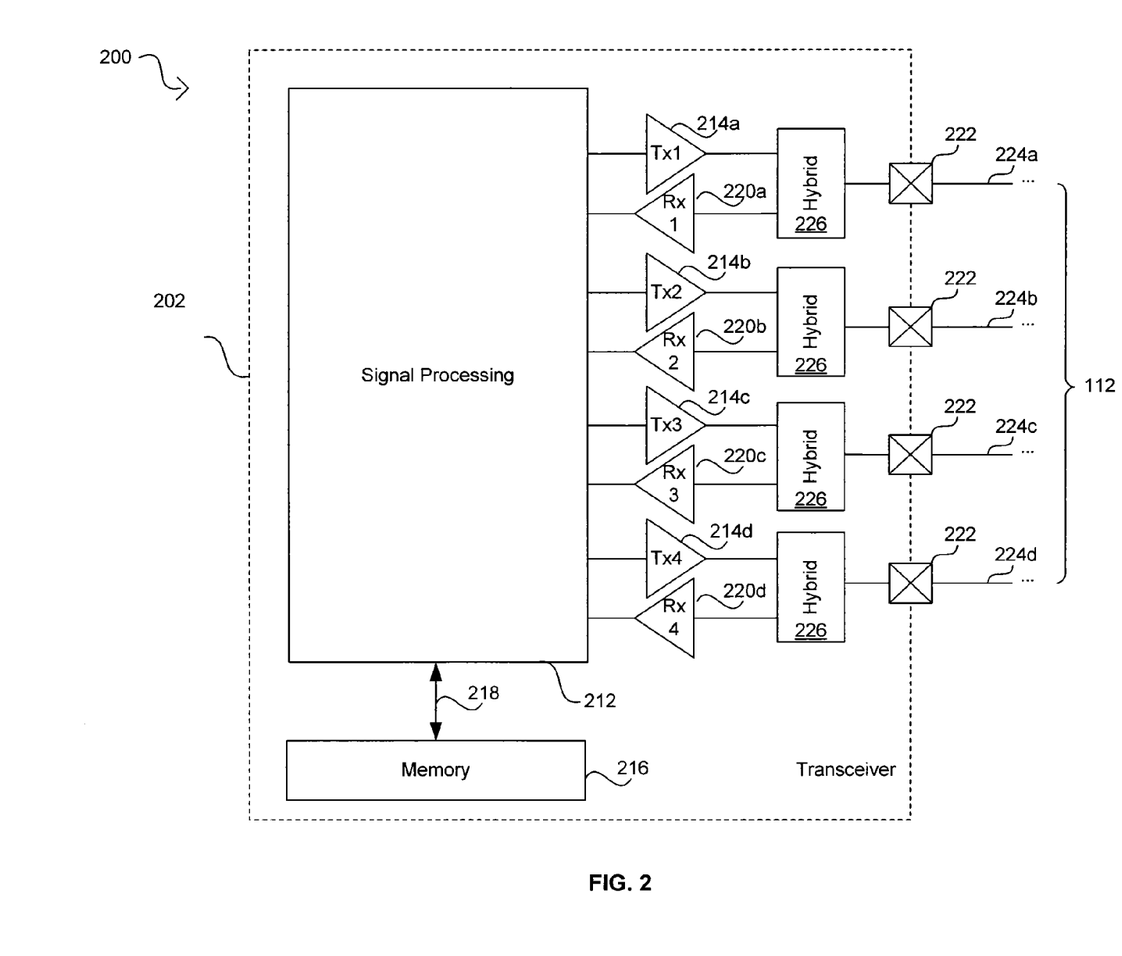
FIG. 2 is a block diagram illustrating an exemplary physical layer device operable to condition signals on a plurality of channels for subsequent signal validation, in accordance with an embodiment of the invention.

FIG. 2 is a block diagram illustrating an exemplary physical layer device operable to condition signals prior to performing signal validation, in accordance with an embodiment of the invention. Referring to FIG. 2, there is shown a communication device 200 which may comprise an Ethernet over twisted pair PHY device 202 and the link 112. The PHY device 202 may comprise a physical layer module 212, one or more transmitters 214a, . . . , 214d, which are collectively referenced as 214, one or more receivers 220a, . . . , 220d, which are collectively referenced as 220, a memory 216, a memory interface 218, one or more hybrids 226 and one or more input/output interfaces 222. The link 112 may comprise one or more physical channels 224a, . . . , 224d, which are collectively referenced as 224.

The PHY device 202 may be an integrated device that may comprise a physical layer module 212, one or more transmitters 214, one or more receivers 220, a memory 216, a memory interface 218, and one or more input/output interfaces 222. The operation of the PHY device 202 may be the same as or substantially similar to that of the PHY devices 110a and/or 110b disclosed in FIG. 1. In this regard, the PHY device 202 may provide layer 1 (physical layer) operability and/or functionality that may enable communication with a remote PHY device. The physical layer module 212 in the PHY device 202 may comprise suitable logic, circuitry, and/or code that may enable operability and/or functionality of physical layer requirements. In this regard, the physical layer module 212 may enable generating appropriate link discovery signaling utilized for establishing communication with a remote PHY device in a remote communication device.

The physical layer module 212 may be configured to operate in one or more of a plurality of communication modes, where each communication mode may implement, for example, a different communication protocol. These communication modes may include, but are not limited to, Ethernet over twisted pair standards 10BASE-T, 100BASE-TX, 1000BASE-T, 10GBASE-T, and other similar protocols that utilize multiple physical channels between communication devices. The physical layer module 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information. In various embodiments of the invention, the physical layer module 212 may be operable to determine whether energy received by one or more of the receivers 220a, 220b, 220c and 220d may comprise a valid signal.

The physical layer module 212 may be coupled to memory 216 through the memory interface 218, which may be implemented as a serial interface or a bus. The memory 216 may comprise suitable logic, circuitry, and/or code that may enable storage or programming of information that may comprise parameters and/or code that may effectuate the operation of the physical layer module 212. The parameters may comprise configuration data and the code may comprise operational code such as software and/or firmware, but the information need not be limited in this regard. Moreover, the parameters may include adaptive filter and/or block coefficients for use, for example, by the physical layer module 212 and/or the hybrids 226.

Each of the transmitters 214a, 214b, 214c, 214d may comprise suitable logic, circuitry, interface and/or code that may enable transmission of data from the communication device 200 to a remote communication device via, for example, the link 112 described in FIG. 1. The receivers 220a, 220b, 220c, 220d may comprise suitable logic, circuitry, interface(s) and/or code that may enable receiving data from a remote communication device. Each of the transmitters 214a, 214b, 214c, 214d and receivers 220a, 220b, 220c, 220d in the PHY device 202 may correspond to a physical channel that may comprise the link 112. In this manner, a transmitter/receiver pair may interface with each of the physical channels 224a, 224b, 224c and 224d. The transmitter/receiver pairs may be enabled to provide an appropriate communication rate and mode for each physical channel.

The input/output interfaces 222 may comprise suitable logic circuitry, and/or code that may enable the PHY device 202 to impress signal information onto a physical channel, for example a twisted pair of the link 112. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium of the physical channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously or may transmit and receive in a half duplex mode over up to four or more physical links. Accordingly, the communication device 200 may comprise a number of hybrids 226 corresponding to the number of physical links. In various embodiments of the invention, the hybrids 226 may comprise suitable logic, circuitry, interface and/or code that may enable separating transmitted and received signals from a physical link. For example, the hybrids may comprise analog echo cancellers. Each hybrid 226 in the communication device 300 may be communicatively coupled to an input/output interface 222.

The communication device 200 may operable to communicate with a remote communication device via the link 112. For example, the PHY device 202 may communicate based on 100BASE-TX, 1000BASE-T and/or 10GBASE-T. The PHY device 202 may be operable to transmit data to and/or receive data from the remote communication device via one or more of the physical channels 224a, 224b, 224c, and 224d. In an exemplary embodiment of the invention, the communication device 200 may be operable to filter and/or cancel energy such as crosstalk, echo and/or other interference that may be received via one or more of the physical channels 224a, 224b, 224c and/or 224d. For example, one or more of the hybrids 226 may be operable to cancel echo and/or a portion of echo within a signal and/or may cancel energy that may be received by the receivers 220a, 220b, 220c and/or 220d. In this regard, noise and/or interference within energy received by the communication device 200 may be reduced prior to signal detection and/or validation.

Figure 3:
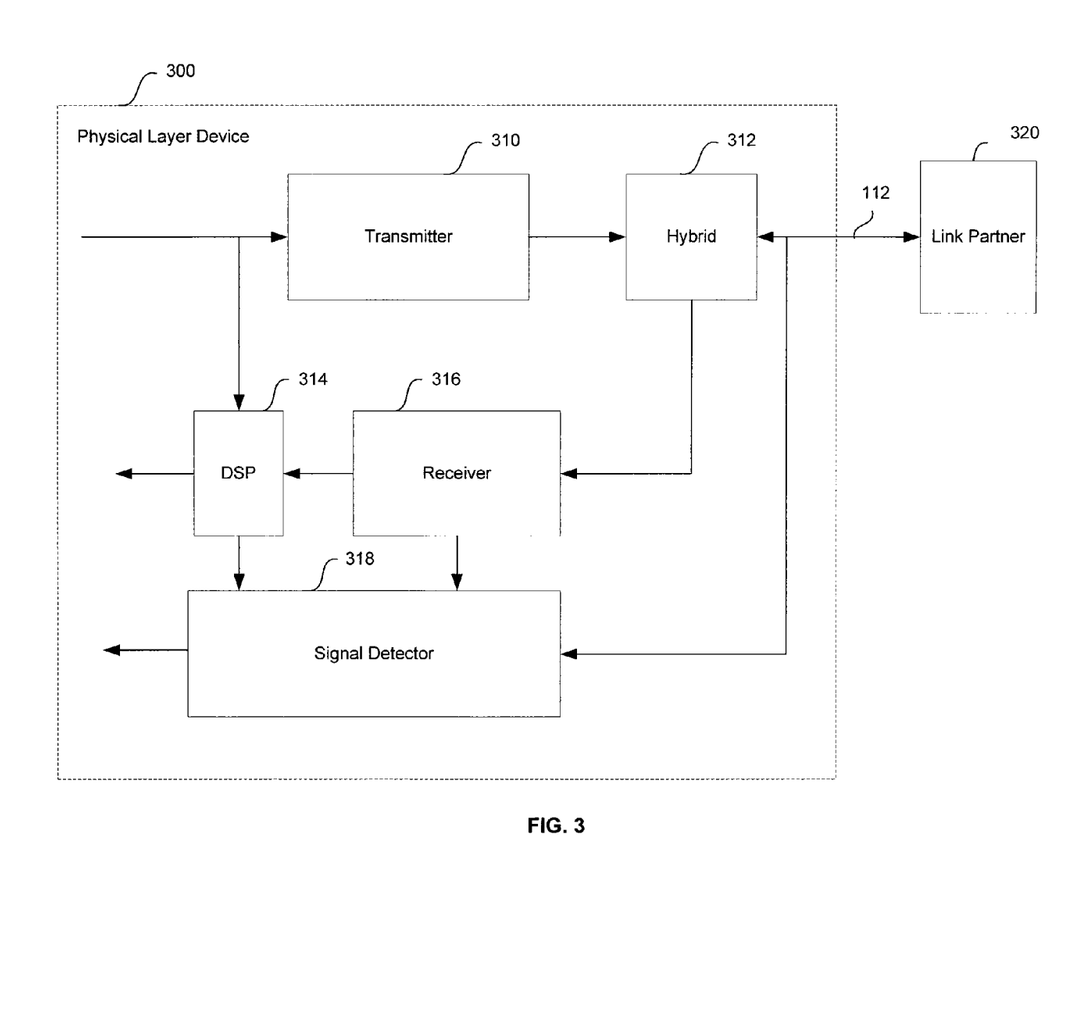
FIG. 3 is a diagram illustrating an exemplary communication device that is operable to utilize digital signal processing and/or analog processing to condition and/or validate received signals, in accordance with an embodiment of the invention.

FIG. 3 is a diagram illustrating an exemplary communication device that is operable to utilize digital signal processing and/or analog processing to condition and/or validate received signals, in accordance with an embodiment of the invention. Referring to FIG. 3, there is shown a physical layer device 300, the link 312 and a link partner 320. The physical layer (PHY) device 300 may comprise a transmitter 310, a hybrid 312, a digital signal processor (DSP) 314, a receiver 316 and a signal detector 318.

The physical layer (PHY) device 300 may comprise suitable logic, circuitry, interfaces and/or code that may be operable to transmit and/or receive signals to and/or from the link partner 320 via the link 112 described with respect to FIG. 1 and/or FIG. 2. The PHY device 300 and/or the link partner 320 may be similar to or substantially the same as the PHY devices 110a and/or 110b described with respect to FIG. 1 and/or the PHY device 202 described with respect to FIG. 2. The PHY device 300 may be operable to detect when energy received via the link 112 comprises a valid signal from a link partner, for example, the link partner 320. In this regard, the PHY device 300 may be operable to reduce noise and/or interference within the received energy prior to performing signal detection and/or signal validation of the received energy.

The transmitter 310, the receiver 316 and/or the hybrid 312 may be similar and/or substantially the same as the transmitters 214, the receivers 220 and/or the hybrids 226 respectively, described with respect to FIG. 2.

The digital signal processor (DSP) 314 may comprise suitable logic, circuitry, interfaces and/or code that may be operable to perform correction techniques on a signal and/or noise energy received from the link 112. For example, in various embodiments of the invention when a link partner comprising the PHY device 300 and the link partner 320 communicate in a half duplex mode, the DSP 314 may be operable to correct for attenuation and/or distortion in the received signal and/or noise energy. In instances when the PHY device 300 and the link partner 320 communicate in a full duplex mode, the DSP may also be operable to reduce and/or mitigate near-end crosstalk and/or echo in the received signal and/or noise energy. In this regard, the DSP 314 may receive information about a signal that may be transmitted via the transmitter 310 and/or the link 112 and/or signals that may be transmitted over neighboring links and/or channels from the PHY device 300. The DSP 314 may utilize information regarding the transmitted signals to subtract near-end crosstalk and/or echo from the received signal and/or noise energy. The DSP 314 may output the corrected signal and/or noise energy to the signal detector 318.

The signal detector 318 may comprise suitable logic, circuitry, interfaces and/or code that may be operable to utilize information about a received signal and/or noise energy that may be in an analog and/or digital domain, to determine whether energy and/or power levels of the received signal and/or noise energy may indicate that a valid signal has been received from the link partner 320 via the link 112 or whether the received energy may only comprise noise. For example, energy level and/or power level information of an analog and/or digitally corrected received signal may be compared with one or more threshold levels to determine whether a valid signal has been received via the link 112.

In operation, the physical layer (PHY) device 300 may receive a signal and/or noise energy via the link 112. The signal and/or noise energy may be processed by the hybrid 312 and the receiver 316 and may be sent to the DSP 314. The DSP 314 may be operable to enhance and/or remove noise from the received signal. In addition, in instances when the physical layer device 300 may operate in a full duplex mode, the DSP 314 may receive information about other signals transmitted by the physical layer device, for example, signal information going into and/or out of the transmitter 310 that may enable the DSP 314 to cancel near-end crosstalk and/or echo in the received signal and/or noise. The DSP may output the corrected received signal to the signal detector 318 that may determine whether a valid signal has been received from the link partner 320.

Figure 4:
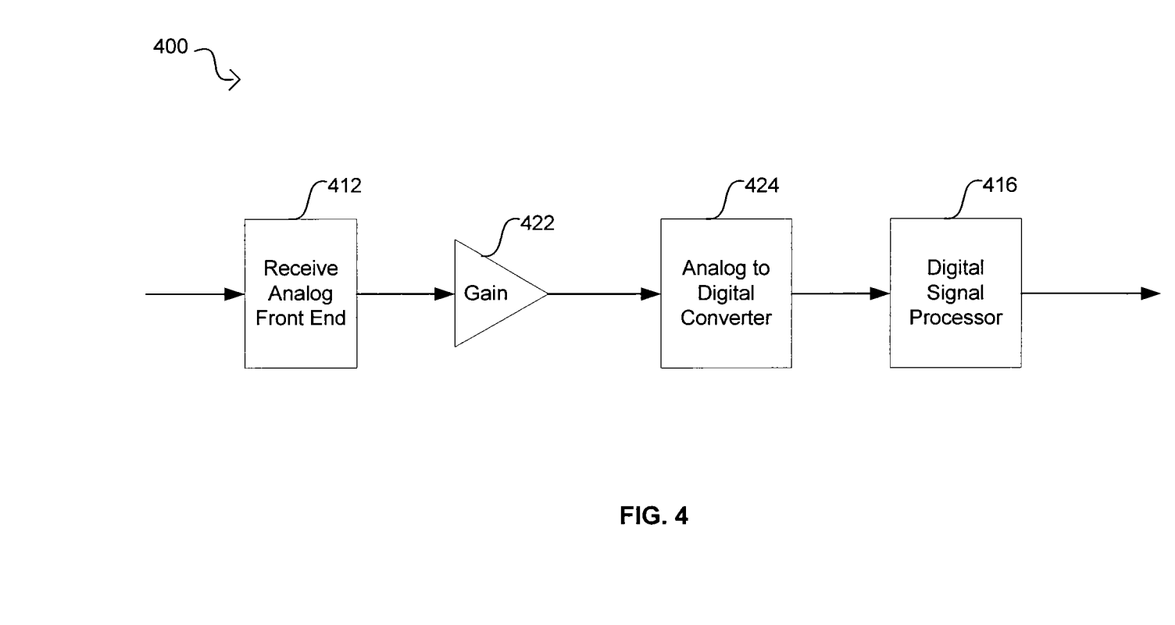
FIG. 4 is a block diagram illustrating an exemplary signal detector that is operable to apply correction techniques prior to determining validity of a signal, in accordance with an embodiment of the invention.

FIG. 4 is a block diagram illustrating an exemplary signal detector that is operable to apply correction techniques prior to determining validity of a signal, in accordance with an embodiment of the invention. Referring to FIG. 4, there is shown, a signal detection system 400 comprising an analog front end 412, a gain stage 422, an analog to digital converter (ADC) 424 and a digital signal processor (DSP) 416.

The signal detection system 400 may comprise suitable logic, circuitry, interfaces and/or code that may be operable to apply correction techniques prior to determining validity of a signal. The signal detection system 400 may be similar to and/or substantially the same as the physical layer device 300, the PHY device 202 and/or the PHY devices 110a and/or 110b and/or portions thereof.

The analog front end 412 may comprise suitable logic, circuitry, interfaces and/or code that may be operable to receive analog signals from a link partner via a link such as the link 112. The received signals may be sent to the gain stage 422. The gain stage 422 may comprise suitable logic, circuitry, interfaces and/or code to may be operable to improve the dynamic range of the received signals. Analog signals output from the gain stage 422 may be communicated to analog to digital converter (ADC) 424. The ADC 424 may comprise suitable logic, circuitry, interfaces and/or code that may be operable to convert the analog signals to discrete time digital signals. The digital signal output from the ADC 424 may be communicated to the digital signal processor (DSP) 416. The DSP 416 may comprise suitable logic, circuitry, interfaces and/or code that may be operable to reduce and/or mitigate noise and/or interference in the digital signals and may determine whether the digital signal comprises noise and/or information received from the link partner.

In operation, signals received via the analog front end 412 may be amplified by the gain stage 422 and converted to a discrete time digital signal by the ADC 424. The signal and/or other information that may comprise transmit signal information may be communicated to the DSP 416. The DSP 416 may be operable to correct and/or recover the discrete time digital signal and may determine whether the digital signal is valid. For example, the DSP 416 may compare the received signal strength to one or more thresholds. Based on the results of the comparison the DSP 416 may output a valid or invalid signal status.

Figure 5:
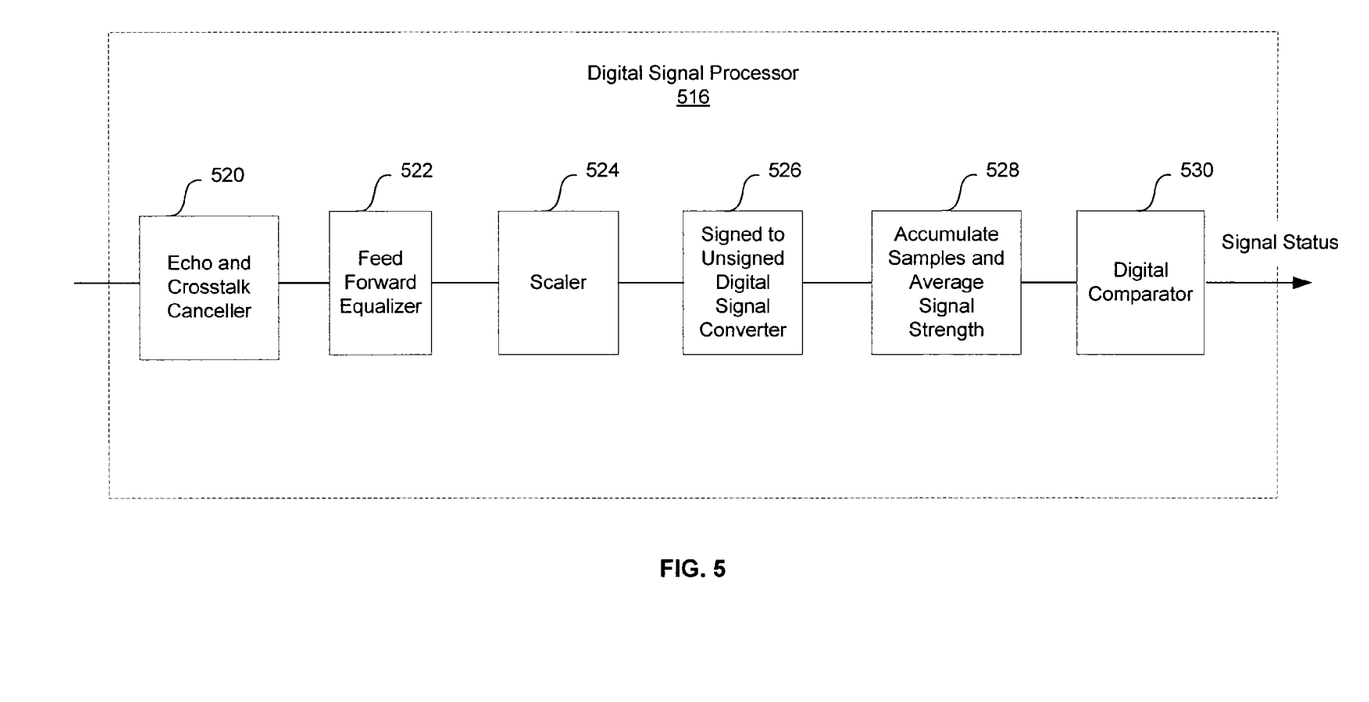
FIG. 5 is a block diagram illustrating an exemplary digital signal processor that is configured to mitigate noise and/or interference prior to detecting a signal, in accordance with an embodiment of the invention.

FIG. 5 is a block diagram illustrating an exemplary digital signal processor that is configured to mitigate noise and/or interference prior to detecting a signal, in accordance with an embodiment of the invention. Referring to FIG. 5, there is shown a digital signal processor (DSP) 516, an echo and/or crosstalk canceller 520, a feed forward equalizer (FFE) 522, a scaler 524, a signed to unsigned digital signal converter 526, an accumulator 528 and a digital comparator 530.

The digital signal processor (DSP) 516 may comprise suitable logic, circuitry, interfaces and/or code that may be operable to mitigate noise and/or interference prior to detecting a signal. The DSP 516 may be integrated within a physical layer device, for example, one or more of the PHY devices 110, 202, 300 and/or within the signal detection system 400, for example. Moreover, the DSP 516 may be integrated within the same chip and/or chipset as the one or more PHY devices. The DSP 516 may be operable to receive a discrete time digital signals that may be received from a link partner as well as digital and/or analog information about signals that may be transmitted from the one or more PHY devices that comprise the DSP 516. The DSP 516 may determine a status of the received signals with regard to whether the signals comprise a valid signal and/or only noise energy. The DSP may output the status of the received signals and/or noise energy and may output the noise reduced signal.

The echo and/or crosstalk canceller 520 may comprise suitable logic, circuitry, interfaces and/or code that may be operable to receive a discrete time digital signal and may mitigate crosstalk and/or echo in the signal. The echo and/or crosstalk canceller 520 may also receive information about signals that may be transmitted from the PHY device comprising the DSP 516. In this regard, the echo and/or crosstalk canceller 520 may be operable to subtract the transmit signal information from the received signal and/or noise to mitigate the crosstalk and/or echo. The echo and/or crosstalk canceller 520 may be operable to output a noise reduced signal to the feed forward equalizer 522.

The feed forward equalizer (FFE) 522 may comprise suitable logic, circuitry, interfaces and/or code that may be operable to normalize attenuated signal levels. In this regard, the signal levels of discrete time digital signals leaving the FFE 522 may be independent of a length of cable length, for example, the length of the link 112 described with respect to FIG. 1. The FFE 552 may receive signals from the echo and/or crosstalk canceller 520 and may output normalized signals to the scaler 524.

The scaler 524 may comprise suitable logic, circuitry, interfaces and/or code that may be operable to receive the normalized discrete time signal from the FFE 522 and may reduce precision in the signal that may be unnecessary for signal detection. In this regard, the scaler 524 may remove one or more least significant bits. In various exemplary embodiments of the invention, the scaler 524 may be implemented with simple shift right logic. The scaler 524 may output a scaled signal to the signed to unsigned digital signal converter 526.

The signed to unsigned digital signal converter 526 may comprise suitable logic, circuitry, interfaces and/or code that may be operable to receive the scaled signal from the scaler 524 and may determine the absolute value and/or the magnitude of the scaled signal. The converted, unsigned, signal may be utilized to determine the signal strength of the scaled signal. In various embodiments of the invention, a power level of the signal may be determined from the scaled signal and/or the unsigned signal. The unsigned signal may be output to the accumulator 528.

The accumulator 528 may comprise suitable logic, circuitry, interfaces and/or code that may be operable to receive the unsigned signal and may sum the unsigned signal with one or more unsigned signal samples previously received by the accumulator 528. In an exemplary embodiment of the invention, the accumulator may be operable to iteratively sum the output of the accumulator with a new unsigned signal sample for a specified number of cycles. The accumulator may also be operable to determine average signal strength for the specified number of summed samples and may output the average signal strength to the digital comparator 530.

The digital comparator 530 may comprise suitable logic, circuitry, interfaces and/or code that may be operable to receive the average signal strength for the specified number of summed samples and may compare the signal strength to one or more threshold levels. In various embodiments of the invention, the digital comparator 530 may comprise hysteresis logic that may be operable detect a valid signal and/or an invalid signal based on a determined number of average signal strength samples received from the accumulator 528. For example, a plurality of consecutively received average signal strength samples may be compared to a high "signal valid" threshold and/or a lower "signal invalid" threshold. In instances when a specified number of signal strength samples meet and/or exceed the "signal valid" threshold, the digital comparator may output a valid signal status. In instances when a specified number of signal strength samples are below the "signal invalid" threshold, the digital comparator may output a signal status of invalid. Additional samples and/or logic, for example, may be utilized to determine a signal status when average signal strength values fall between thresholds. The thresholds may be configurable and/or programmable. Furthermore, the thresholds may be based on information from a link partner about its own transmission signal statistics and/or its signal constellation.

Figure 6:
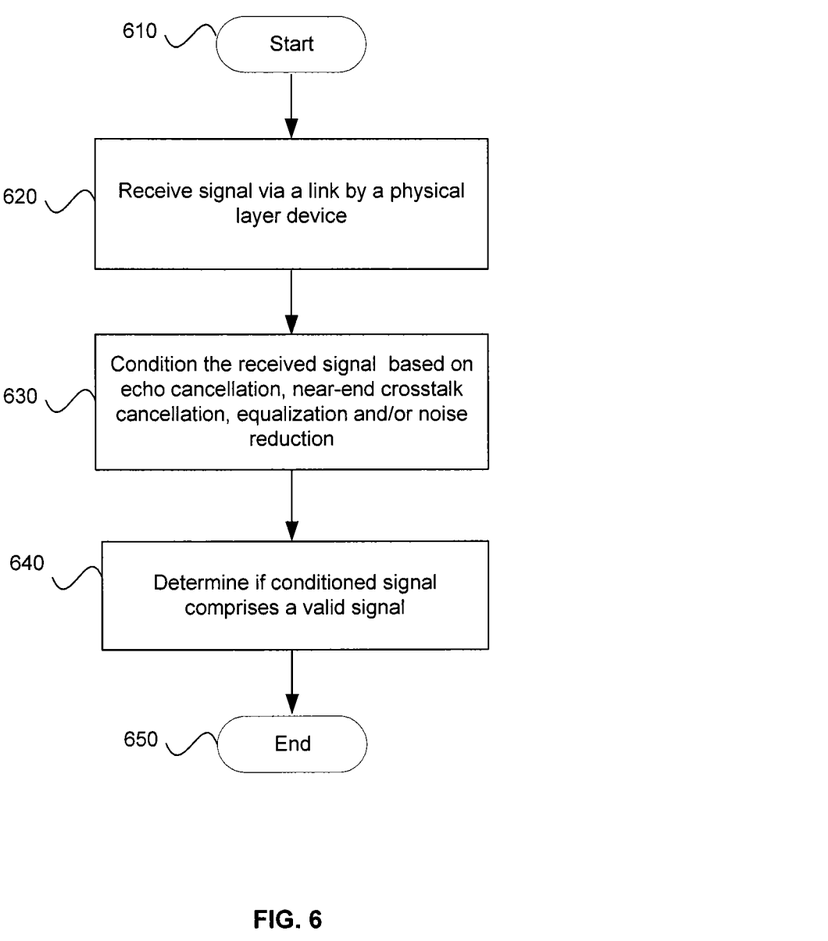
FIG. 6 is a flow chart illustrating exemplary steps for detecting a valid signal and/or invalid signal based on a noise reduced signal, in accordance with an embodiment of the invention.

FIG. 6 is a flow chart illustrating exemplary steps for detecting a valid signal and/or invalid signal based on a noise reduced signal, in accordance with an embodiment of the invention. The exemplary steps may begin with start step 610. In step 620, physical layer device for example, the physical layer device 300, may receive signal energy via a link such as the link 112. In step 630, the received signal energy may be conditioned. For example, the received signal energy may be enhanced and/or may be noise reduced based on echo cancellation, near-end crosstalk cancellation, equalization and/or other noise reduction methods. In step 640, validity of the conditioned signal may be determined, for example, by the digital signal processor 516. Step 650 may be an end of exemplary steps.

In an embodiment of the invention, one or more communication devices, for example, 106a and/or 106b that may be coupled via a communication link 112 may comprise physical layer devices 110a and/or 110b that may be operable to determine presence of a signal received via the communication link 112 and to mitigate noise in the signal prior to processing the signal. In this regard, processing the signal may comprise validating the signal. Analog and/or digital signal processing may be utilized to process the signal and/or mitigate noise in the signal. For example, noise mitigation in the DSP 516 may comprise near-end crosstalk cancelling and/or echo cancelling by echo and crosstalk cancellers 520. The noise mitigation may utilize local transmit signal information, for example. Subsequent to the noise mitigation, samples of the noise reduced signal may be accumulated and/or an average signal strength and/or average signal power level may be determined, for example, the accumulator 528. The average signal strength and/or average signal power level of the noise reduced signal may be compared to one or more thresholds, for example, by the digital comparator 530. The thresholds may be configurable and/or programmable. In this manner, a received signal may undergo noise mitigation prior to determining whether the signal may be a valid signal from a link partner, for example.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for a combined signal detection for physical layer communication devices.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication that causes a physical layer device of a communication device to perform a method, comprising:
   determining, independently of a hybrid circuit, whether a signal is received at an input of the hybrid circuit from a communication link;
   mitigating, using the signal received at the input of the hybrid circuit, noise in a hybrid output signal output by the hybrid circuit based on the signal received at the input of the hybrid circuit; and
   processing the hybrid output signal after mitigating the noise.

2. The method according to claim 1, wherein the processing of the hybrid output signal includes:
   normalizing an attenuation of the hybrid output signal; and
   scaling the hybrid output signal by removing at least one least significant bit.

3. The method according to claim 1, wherein said processing said hybrid output signal comprises validating said hybrid output signal.

4. The method according to claim 1, comprising processing said hybrid output signal utilizing at least one of analog and digital signal processing.

5. The method according to claim 1, comprising mitigating said noise utilizing at least one of analog and digital signal processing.

6. The method according to claim 1, comprising mitigating said noise utilizing local transmit signal information local to the communication device.

7. The method according to claim 1, comprising mitigating said noise utilizing at least one of near-end crosstalk cancellers and echo cancellers.

8. The method according to claim 1, comprising accumulating samples of said hybrid output signal subsequent to said mitigating said noise.

9. The method according to claim 2, comprising determining an average signal strength of the hybrid output signal after mitigating the noise.

10. The method according to claim 9, comprising comparing the average signal strength of said hybrid output signal to one or more thresholds subsequent to said mitigating said noise.

11. The method according to claim 10, comprising configuring said one or more thresholds.

12. A system for communication via a communication link, the system comprising:
   circuitry configured to
      determine, independently of a hybrid circuit, whether a signal is received at an input of a hybrid circuit from the communication link, mitigate, using the signal received at the input of the hybrid circuit, noise in a hybrid output signal output by the hybrid circuit based on the signal received at the input of the hybrid circuit, and
      process the hybrid output signal after mitigating the noise.

13. The system according to claim 12, wherein the circuitry validates the hybrid output signal when the circuit processes the hybrid output signal.

14. The system according to claim 12, wherein the circuitry processes the hybrid output signal using at least one of analog and digital signal processing.

15. The system according to claim 12, wherein the circuitry mitigates the noise using at least one of analog and digital signal processing.

16. The system according to claim 12, wherein the circuitry mitigates the noise using local transmit signal information.

17. The system according to claim 12, wherein the circuitry mitigates the noise using at least one of near-end crosstalk cancellers and echo cancellers.

18. The system according to claim 12, wherein the circuitry accumulates samples of said hybrid output signal subsequent to said mitigating said noise.

19. The system according to claim 12, wherein the circuitry determines an average signal strength of said hybrid output signal subsequent to mitigating the noise.

20. The system according to claim 19, wherein the circuitry compares the average signal strength the hybrid output signal to one or more thresholds subsequent to mitigating the noise.

21. The system according to claim 20, wherein the circuitry configures the one or more thresholds.

* * * * *